Figure 1:
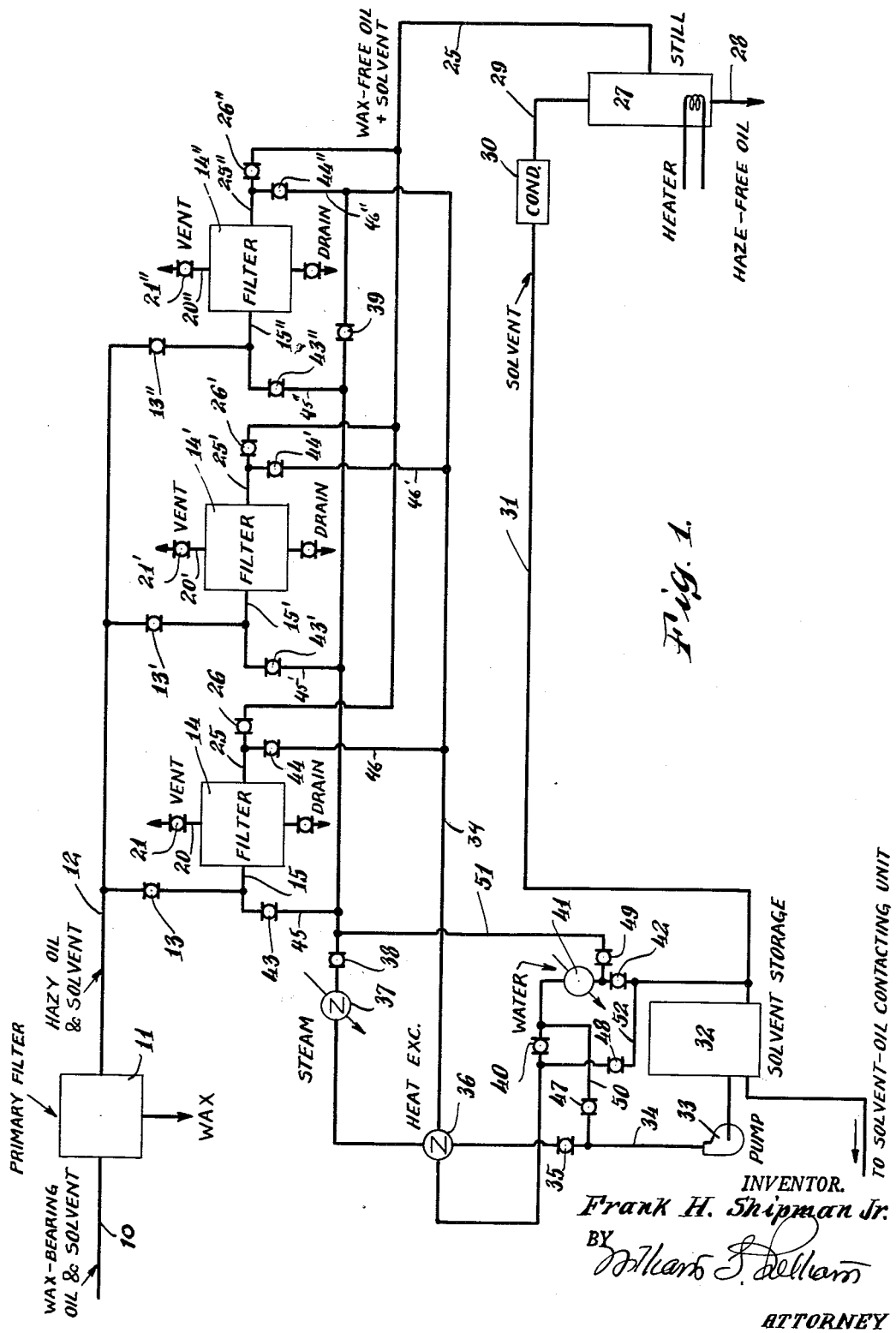

July 10, 1956   F. H. SHIPMAN, JR   2,754,250
REMOVAL OF WAX HAZE FROM LUBRICATING OILS
Filed April 10, 1953   2 Sheets-Sheet 2

INVENTOR.
Frank H. Shipman Jr.
BY
ATTORNEY.

United States Patent Office 2,754,250
Patented July 10, 1956

2,754,250

REMOVAL OF WAX HAZE FROM LUBRICATING OILS

Frank H. Shipman, Jr., Maplewood, La., assignor to Cit-Con Oil Corporation, Lake Charles, La., a corporation of Delaware Application April 10, 1953, Serial No. 347,954

3 Claims. (Cl. 196—19)

This invention relates to the removal of haze from lubricating oils, and more particularly to the further treating of oils which have been solvent dewaxed for the purpose of removing residual haze-forming wax from the oils.

In conventional solvent dewaxing processes, using a methyl ethyl ketone-toluene solvent, little difficulty is encountered in producing haze-free lighter lubricating oil, but in the processing of heavier oils, such as bright stock, sufficient wax passes through the filters to cause the oil to become hazy on standing, even though it may appear to be free of haze when first taken from the solvent recovery unit.

It is an object of this invention to provide a continuous filtration process which it effective to produce a lubricating oil which is free from haze.

It is a further object of this invention to provide a method for recovering, as a valuable by-product, wax which passes through the primary filter of a conventional solvent dewaxing process.

It is still another object of this invention to provide a method for removing wax from a filter without altering the physical condition of the filter, whereby to preserve the efficiency of the filter over long periods of time.

I have found that the foregoing objects may be obtained by passing a chilled oil-solvent mixture recovered from the primary filters of a conventional solvent dewaxing process to one of a battery of secondary filters containing a plurality of filter elements, so constructed as to prevent passage of particles greater than 8 microns in diameter. Oil-solvent mixture passing through the latter filter is conducted to a solvent recovery unit in which the solvent is taken overhead, condensed, and returned to storage, while a haze-free lubricating oil fraction is recovered as a bottoms product.

As the oil-solvent mixture passes through the secondary filter, wax will be retained by the filter, and the pressure drop across the filter will rise. When the pressure drop across the filter has built up to a predetermined point, depending upon the filter element construction, flow of the oil-solvent mixture is diverted to a second of the battery of secondary filters, in which the oil-solvent mixture is treated in the same manner as in the first filter. Heated solvent from the main process solvent storage is then passed through the first secondary filter until the pressure drop across the filter has declined to a value indicating that a desired amount of the wax has been dissolved. The solvent, containing the dissolved wax, is cooled and returned to the solvent storage. When the wax content of the filter elements has been reduced to the desired amount, unheated solvent is passed through the filter to bring the temperature down to a point approaching ambient temperatures at which time flow of solvent is stopped and the filter, full of solvent, is held in stand-by condition until it is desired to return it to service. In returning the filter to service, cold oil-solvent mixture from the primary filter is passed through the secondary filter until its temperature has been brought down to about 0° F. During this stage of the operation the oil-solvent mixture from the secondary filter is not passed to the solvent recovery still, but is instead passed to the solvent storage, from which the oil contained in the mixture is recycled to the initial solvent-oil contacting step. After the filter has cooled has cooled to about 0° F., the oil-solvent mixture is diverted to the solvent recovery unit to produce a finished lubricating oil, as in the original operation.

Figures 2, 3:
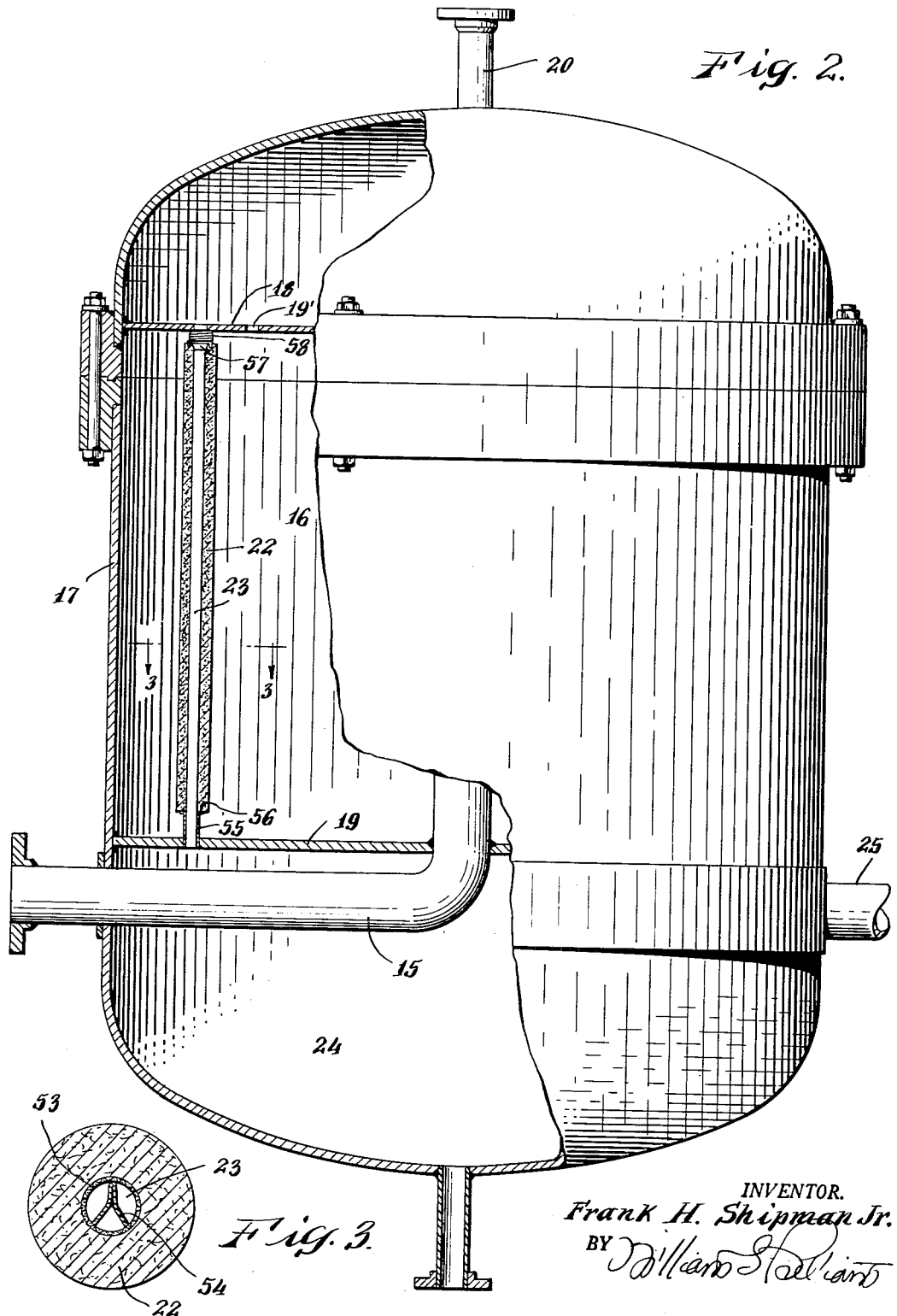

In order to enable those skilled in the art more fully to appreciate my invention and the manner of carrying it out, it will be more particularly described in connection with the accompanying drawings in which Fig. 1 is a diagrammatic flow sheet of my new process, Fig. 2 is an elevational view, partly in cross-section, of the filter assembly, incorporating filter elements of a preferred type, in which the haze-forming residual wax is removed from the oil-solvent mixture, and Fig. 3 is a horizontal cross-sectional view taken along the line 3—3 of Fig. 2.

Referring now more particularly to Fig. 1, a mixture of wax-bearing oil and a solvent, which may be any solvent used in conventional solvent dewaxing process, is cooled to a temperature of from about −11° F. to about −17° F., and is passed through line 10 to a primary filter 11, of the conventional drum type, in which wax is separated as a filter cake, the oil-solvent mixture being recovered from the filter substantially free of wax. It has been found in practice, however, that even the best constructed filter will, in the course of operation, develop minor leaks, so that the oil-solvent mixture leaving the filter may contain a minute quantity of wax, insufficient to affect appreciably the physical characteristics of the finished oil, but sufficient to impart a haze to the oil which many customers find objectionable. For some reason unknown to me, this problem is not particularly troublesome with lighter grades of oil, but in heavier grades, such as bright stocks, it becomes acute.

In accordance with my invention, therefore, the oil-solvent mixture is taken from the primary filter 11 and is led through line 12 and one or more valves 13, 13', 13" to one or more of a battery of secondary filters 14, 14', 14" respectively, the preferred construction of which is more particularly shown in Fig. 2. It will be understood, however, that filters of other types may be used. In starting up operation, the oil-solvent mixture, maintained at a low temperature, preferably in the vicinity of from about −11° F. to about −17° F., is conducted through inlet pipe 15 into a filter chamber 16 defined by the wall 17 of the filter 14, compression plate 18, and separator plate 19. As the oil fills the chamber 16 gas will be displaced from the chamber through passage holes 19' in the compression plate 18 and through vent 20. When the oil-solvent mixture appears in the vent 20, valve 21 in the vent 20 is closed, and the oil-solvent mixture will commence to flow through filter element 22 and its associated flow passage 23 to a sump 24, defined by the bottom of filter 14 and the separator plate 19, and thence out through outlet line 25 and open valve 26 to a solvent recovery unit such as a still 27, in which the solvent is taken overhead, and from which a haze-free oil is withdrawn through line 28 to storage. The solvent taken overhead through line 29 is passed to a condenser 30, from which it is conducted through line 31 to solvent storage tank 32.

After the filter has been on stream for some time, the pressure drop across the filter will build up from its initial value to about 25 to 30 lbs. p. s. i., at which time the oil-solvent flow is diverted to filter 14' by closing valves 13 and 26 and opening valves 13' and 26', and processing of the oil-solvent mixture is continued as described above, the oil-solvent mixture being passed to the solvent-recovery still 27 via line 25' and open valve 26'.

In the meantime, in preparation for the shut down of filter 14, solvent from solvent storage 32 has been circulating under the influence of pump 33 through line 34, open valve 35, heat exchanger 36, heater 37, open valves 38 and 39, back through heat exchanger 36, open valve 40, cooler 41, and open valve 42 to storage 32. The heat input to heater 37 is regulated to maintain the solvent at a temperature of from about 180° to 200° F. on its exit from the heater. It should be understood, of course, that sufficient pressure is maintained in the system to keep the solvent in liquid phase. When flow of the oil-solvent mixture is diverted to filter 14' by the closing of valves 13 and 26, valve 39 is closed, and valves 43 and 44 are opened to allow the hot solvent to flow into filter 14 via line 45. Filter 14 is at this time full of cold oil-solvent mixture, which is displaced by the hot solvent and passed through lines 46 and 34, valve 40, cooler 41 and valve 42, to solvent storage 32. From storage the oil content will be returned to the process at a point before the primary filter 11, so that it will eventually be recovered as finished oil. It will be noted that the direction of flow of the solvent is the same as that of the cold oil-solvent mixture, whereby to avoid explosion of the filter elements.

Hot solvent is passed through the filter 14 until the pressure drop through the filter has been lowered to a point which indicates that substantially all the wax has been dissolved from filter elements 22. At this time valves 35, 38, 40, and 42 are closed, and valves 47, 48, and 49 are opened to divert the solvent flow through line 50, the cooler 41 and lines 51 and 45 to the filter 14, and thence through lines 46, 34, and by-pass line 52 back to storage 32. Passage of cool solvent through the filter is then continued until the temperature within the filter drops to that of the solvent entering the filter. Solvent circulation through the filter is then stopped by closing valve 43, and by shutting down the pump 33. When it is desired to return the filter to service, valve 13 is opened, and cold oil-solvent mixture is passed through the filter 14, valve 44 and lines 46 and 34 to solvent storage 32, where it is mixed with the solvent supply and is returned to the process at a point ahead to the primary filter 11. Circulation of oil-solvent mixture is continued in this manner until the filter temperature has dropped to a temperature of about 0° F., at which time valve 44 is closed and valve 26 is opened to allow the oil-solvent mixture to pass to the solvent recovery unit 27. The filter 14' may then be washed with hot solvent in the manner described above to remove wax deposited on the filter elements, and to place it in condition for further filtering operations.

While the description above has been confined to the use of two filters, one of which is on stream while the other is being washed, it is advantageous to provide three or more filters connected in parallel to the system, since the on stream time is generally much longer than the time required for washing. Thus, in Fig. 1, three such filters, 14, 14', and 14" are shown, two of which would be on stream at all times, while the third is either being washed or held in stand-by condition.

It will be apparent from the foregoing that I have provided a continuous process for freeing oil of wax haze, and that no valuable products are lost, since all oil and wax contained in the filters at the start of the washing operation, the wax deposited on the filter elements during filtration, and the oil passed through the filter to bring it back to operating temperatures, are all recovered in the solvent and returned to the process ahead of the primary filter 11.

Referring now more particularly to Figs. 2, and 3, my preferred form of filter element 22 is made of cotton wicking wound on a wire mesh core 53 according to the directions given in U. S. Patent 1,958,268 and so constructed as to prevent the passage of particles greater than 8 microns. The element 22 is supported by an angle iron core member 54, which is secured at its lower end to a pipe member 55 leading through separator plate 19 to the sump 24. The pipe member 55 is provided at its upper end with a flange having an upturned rim 56 against which the lower end of the filter element 23 is pressed, to avoid leakage between the filter element and the pipe member. The upper end of the filter element 23 is closed by a cup member 57, which is pressed firmly against the upper end of the filter element by a coil spring 58 compressed between the cup member 57 and the compression plate 18, whereby to obviate leakage at this point. While only one filter element is shown in Fig. 2, for the purpose of clarity, in commercial practice of my invention each filter may contain from one up to three hundred or more filter elements. While I prefer filter elements constructed as described in U. S. Patent 1,958,268, it should be apparent that filters of different construction may be used, provided only that they are capable of preventing the passage of wax particles greater than 8 microns in size, and can retain considerable quantities of wax particles without excessive pressure drop through the filter.

Having now described my invention, what is claimed is:

1. In a solvent dewaxing process wherein a solvent is withdrawn from storage, mixed with a wax-bearing oil, the oil-solvent mixture chilled, filtered in a primary filter to remove wax from said oil and passed to a solvent-recovery unit wherein a substantially wax-free oil is recovered as a bottoms product, and solvent is recovered as an overhead product for return to storage and further use as wax solvent, the improvement comprising interposing a secondary filter in the line between the primary filter and the solvent-recovery unit, said secondary filter containing filter elements operative to screen out and permit solvent removal of screened particles greater than eight microns in diameter, flowing the chilled oil-solvent mixture recovered from the primary filter through the secondary filter until the pressure drop across the secondary filter due to wax deposit has built up to a value of not more than about thirty pounds per square inch, discontinuing flow of the oil-solvent mixture through the secondary filter, withdrawing solvent from storage, heating the solvent to a temperature above the melting point of the wax retained on the filter elements of the secondary filter, passing the hot solvent through the secondary filter in the same direction of flow as the oil-solvent mixture, and returning wax-bearing solvent to the solvent storage, continuing to flow hot solvent through the secondary filter until substantially all of the wax therein retained has been removed, discontinuing flow of hot solvent through the secondary filter, cooling said secondary filter and resuming the flow of chilled oil-solvent mixture from the primary filter through the secondary filter to the solvent recovery still.

2. In a solvent dewaxing process wherein the solvent is withdrawn from storage, mixed with a wax-bearing oil, the oil-solvent mixture chilled, filtered in a primary filter to separate wax and passed to a solvent-recovery unit wherein a substantially wax-free oil is recovered as a bottoms product and solvent is recovered as overhead for the further removal of wax, the improvement comprising interposing a secondary filter in the line between the primary filter and the solvent-recovery unit, the said secondary filter containing filter elements operative to screen out of the substantially wax-free oil and solvent haze-producing particles greater than eight microns in diameter, said secondary filter being operative to permit solvent removal of screened out particles, flowing the chilled oil-solvent mixture recovered from the primary filter through the secondary filter until pressure drop across the secondary filter due to wax deposit has increased to an amount of not more than about thirty pounds per square inch, discontinuing flow of the oil-solvent mixture through the secondary filter to the solvent-recovery unit, withdrawing solvent from storage, heating the solvent to a temperature of from about 180° F. to about 200° F., passing the hot solvent through the secondary filter in the same direction of flow as the oil-solvent mixture, and returning the solvent together with the wax and oil content of the filter displaced by said solvent to the solvent storage, continuing to flow hot solvent through the secondary filter until substantially all the wax retained therein has been removed, said wax removal being indicated by a substantial lowering of the pressure drop across the secondary filter, thereafter flowing cool solvent through the secondary filter so as to reduce the temperature of said secondary filter at least partially down to filtering temperature, further reducing the temperature of said secondary filter by flowing chilled oil-solvent mixture from the primary filter through the secondary filter until the temperature of said secondary filter is reduced to about 0° F., passing the oil-solvent mixture to the solvent storage, and thereafter resuming the flow of chilled oil-solvent mixture from the primary filter through the secondary filter to the solvent-recovery unit.

3. In a solvent dewaxing process as claimed in claim 2, wherein hot solvent is passed through the secondary filter to remove haze-producing particles present thereon, the additional step of maintaining the hot solvent under sufficient pressure to keep the hot solvent in liquid phase.

References Cited in the file of this patent

UNITED STATES PATENTS

| | | |
|---|---|---|
| 2,221,993 | Oswald | Nov. 19, 1940 |
| 2,397,868 | Jenkins | Apr. 2, 1946 |
| 2,463,845 | Backlund et al. | Mar. 8, 1949 |
| 2,560,193 | Shoemaker | July 10 1951 |